May 23, 1950  B. AMES  2,508,357
HEATING UNIT FOR ELECTRICALLY ENERGIZED COOKERS
Original Filed May 31, 1946  2 Sheets-Sheet 2

Inventor
Butler Ames
by Roberts Cushman & Grover
Attys.

Patented May 23, 1950

2,508,357

UNITED STATES PATENT OFFICE 2,508,357

HEATING UNIT FOR ELECTRICALLY ENERGIZED COOKERS

Butler Ames, Boston, Mass.

Original application May 31, 1946, Serial No. 673,267. Divided and this application August 19, 1947, Serial No. 769,396

6 Claims. (Cl. 219—37)

This invention pertains to electrically energized heating units useful, for example, in cookers of the general type disclosed in my prior Patents Nos. 2,224,945 and 2,300,837, dated December 17, 1940, and November 3, 1942, respectively, the present application being a division of my copending application Serial No. 673,267, filed May 31, 1946.

The principal object of the invention is to provide an electrically energized heating unit designed to emit radiations which are effective for cooking food, etc. A further object is to provide an electrically energized heating unit designed to emit radiations which are effective for destroying or modifying odors and smoke resultant from cooking or oven cleaning operations. A further object is to provide an electrically energized heating unit of extremely high efficiency but which is simple in construction and which has a long effective life. A further object is to provide an electrically energized heating unit having the above characteristics and which is capable of embodiment in a structure of convenient shape and dimensions. Other and further objects and advantages of the invention will be pointed out in the following more detailed description and by reference to the accompanying drawings, wherein Fig. 1 is a plan view showing the improved heating unit of the present invention mounted in a suitable supporting sleeve;

Figure 1:
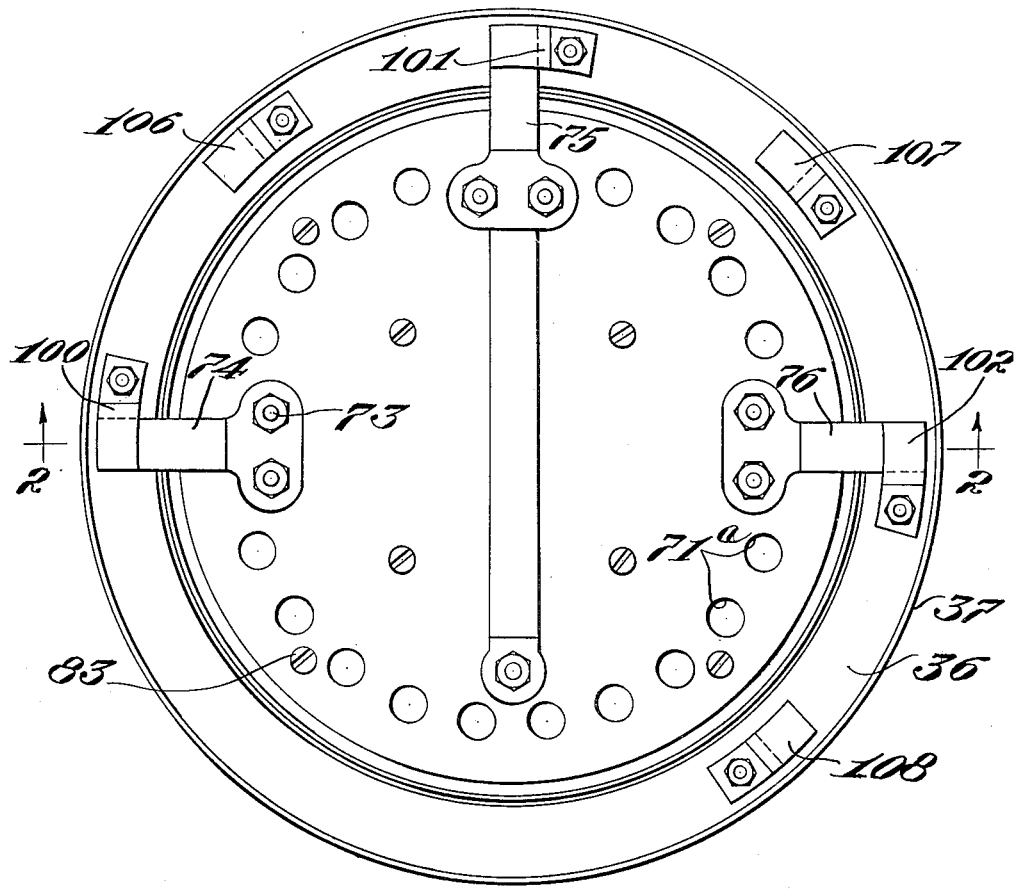
Figure 2:
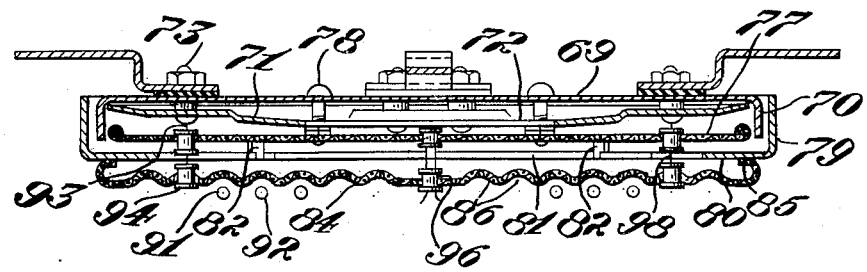
Fig. 2 is a diametric section showing the heating unit separate from the supporting sleeve, substantially on the line 2—2 of Fig. 1.

Referring to the drawings the improved heating unit of the present invention comprises an outer protective casing comprising two shallow opposed cups, one telescoped within the other. As illustrated in Fig. 2, the inner or upper cup or cover is inverted, having its bottom 69 uppermost and having the cylindrical side wall 70. The bottom 69 has a plurality of apertures 74a (Fig. 1) shown as disposed at the same distance from the center of the cup. Within the upper cup and held in spaced relation to its bottom 69 is a reflector plate 71 of bright aluminum. This plate is downwardly convex, as shown in Fig. 2, with its edge slightly spaced from the bottom of the cup and having a central aperture 72. The marginal portion of this reflector plate 71 is held in spaced relation to the cup bottom 69 by means of bolts 73 passing through apertures in the plate and the bottom 69 of the cup, refractory insulating washers being interposed between the cup and plate.

Insulated contact blades 74, 75 and 76 are fixedly secured to the upper surface of the cup bottom 69 by the bolts 73. These contact blades, as shown in Fig. 1, are or may be located 90° apart. A protective disk 77 of wire mesh screen is arranged substantially in the plane of the lower edge of the wall 70 of the upper cup, and is held in spaced relation to the reflector 71 by studs 78 fixed to the cup bottom 69. The screen disk 77 protects the reflector plate 71 from melting, and also acts to reflect radiation back toward the heating elements, while the plate reflects back the radiations which pass through the screen. The heated gases and vapors pass up around the circumference, and then over the heated surface of this aluminum plate 71, and in close contact therewith, which is smaller in diameter than the cup in which it is held, and then pass out through the holes 74 in the cup bottom.

The outer or lower cup which forms the lower part of the casing of the heating unit is of larger diameter than the upper cup and is arranged in concentric relation to the latter with the cylindrical wall 79 of the lower cup surrounding but spaced from the wall 70 of the upper cup and with the bottom 80 of the lower cup spaced from the disk 77. The bottom 80 of the lower cup has a large central aperture 81, the margin of this aperture having upturned tabs 82 which engage the lower side of the disk 77, as shown in Fig. 2, thereby to hold the disk 77 in contact with the studs 78. Bolts 83 (Fig. 1) pass through aligned openings in the bottoms 79 and 80 of the two cups, and hold the cups in assembled relation.

A wire mesh disk 84 is arranged below and parallel to the bottom 80 of the lower cup. This disk 84 has an upturned flange 85 at its edge which bears against the under surface of the cup bottom 80, and is preferably provided with concentric annular corrugations providing a series of concentric grooves 86 in its lower surface. While these grooves are here shown as concentric, it is within the purview of the invention to provide a single spiral groove instead of the series of concentric grooves.

Figure 3:
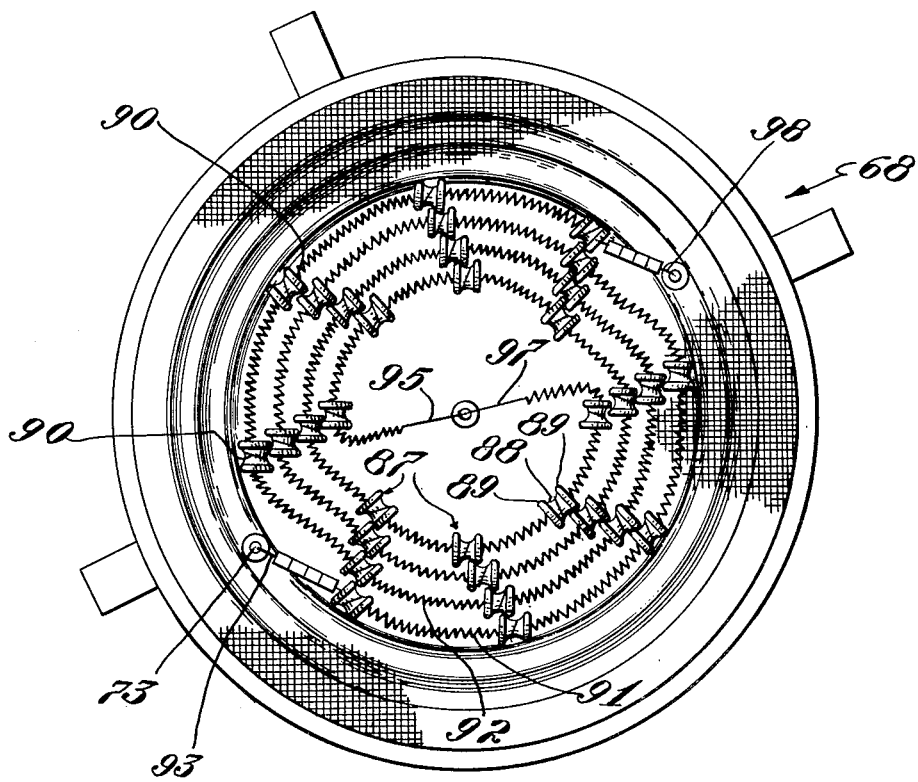
Fig. 3 is a bottom view of the heating unit showing the arrangement of the resistance coils and the supports for the coils.

Within these grooves there are disposed a plurality of insulating grommets or spool-like sleeves 87 (Fig. 3) of refractory, electrical insulating material, for example, porcelain, each grommet having a central barrel portion 88 (Fig. 3)

and head portions or radial end flanges 89 of larger diameter than the barrel. These grommets are tubular and arranged with their axes parallel to the plane of the disk 84, and with the edges of their heads or radial end flanges contacting the walls of the grooves 86. These grommets or sleeves are attached to the screen disk 84 by tie wires 90 preferably of stainless steel, which are wrapped around the barrels of the grommets and which pass up through the meshes of the screen and have their ends united above the screen. The grommets constitute insulating supports for the resistance coils 91 and 92, which may be of any of the usual materials employed for this purpose. Not only do the corrugations in the screen disk 84 provide cradles for the grommets, but they also serve to spread the radiations from the heating elements throughout the oven.

As illustrated in Fig. 3, the grommets which support the coils 91 and 92, are arranged in a spiral series, the turns of one spiral series being interposed between those of the other. The grommets are preferably arranged in groups, as shown in Fig. 3, so as to expose unobstructed arcs of the resistance coils of as great a length as is consistent with adequate support.

One end 93 (Fig. 3) of the coil 91 is passed through a refractory insulating sleeve 94 set in the screen 84 and through a refractory sleeve in the screen 77 and is then attached to one of the bolts 73 which anchors the contact blade 74 to the cup bottom 69. The opposite end 95 of coil 91 passes through an insulating sleeve 96 at the center of the screen disk 84 and through a second insulating sleeve in the screen 77 and is electrically connected to contact blade 75. The inner end 97 of coil 92 is likewise connected to contact blade 75, while its opposite end 98 passes through insulating sleeves in the screens 77 and 84 and is electrically connected to the contact blade 76.

Figure 4:
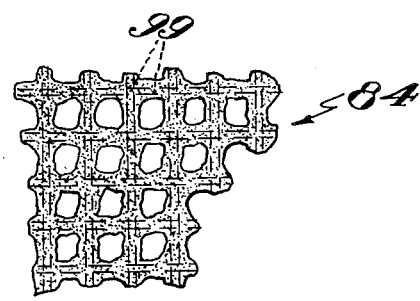
Fig. 4 is a fragmentary plan view, to large scale, illustrating the character of the screen which forms a support for the resistance coils.

The screen disk 84 and the insulating grommets 87 (after the latter have been attached to the screen disk) are coated, for example by spraying or dipping, with a refractory cement 99 such as Alundum (Fig. 4). The screen is then baked to harden the cement. This coating covers the grommets and the constituent wires of the screen, but does not completely close the openings in the screen, as shown in Fig. 4. Through these openings in this screen, and close to the heating elements, must pass all the airborne products of cooking, whether the door of the cooker is closed or open, and are so brought in close proximity to the radiations that destroy or change them. The screen disk 77 is preferably coated in the same manner with a refractory cement.

While one desirable embodiment of the invention has herein been illustrated and described by way of example, it is to be understood that the invention is broadly inclusive of any and all modifications falling within the scope of the appended claims.

I claim:

1. A heating unit for use in an electrical cooker, said unit comprising an annular support, a wire mesh screen secured at its margin to the support, refractory insulating elements attached to the screen, a resistance heating element carried by said insulating elements, a second screen spaced from and parallel to the first, refractory material coating the constituent wires of the two screens while leaving their meshes substantially unobstructed, and a reflector element parallel to and spaced from the second screen.

2. A heating unit for use in an electrical cooker, said unit comprising a shallow metallic cup having an annular flange, a fire mesh screen united at its edge to said flange, insulating means supporting a resistance element closely adjacent to and at the outer side of the screen, a second screen within the cup and parallel to but spaced from the first screen, refractory material coating the constituent wires of the two screens but leaving the screen mesh open, and a metallic reflecting element within the cup at the inner side of the second screen and spaced from the latter, the edge of said reflector element being spaced from the side wall of the cup, and the cup bottom having an opening therein for the escape of gaseous material.

3. A heating unit for use in an electrical cooker, said unit comprising two shallow opposed cups telescoped one within the other, the inner cup being inverted, each cup having substantially cylindrical side walls, the bottom of the inner cup having a plurality of apertures for the passage of gases, a reflector plate having a central aperture disposed within the inner cup with its edge spaced from the cylindrical wall of the cup, means holding the reflector cup spaced from the bottom of the inner cup, the bottom of the outer cup having a central aperture, a foraminous disc disposed below the bottom of the outer cup, and refractory supports for a resistance element attached to the underside of said foraminous disc.

4. A heating unit for an electrical cooker, said unit comprising a shallow cup having a large central aperture in its bottom, a disc of foraminous material disposed below the cup bottom, a plurality of insulating supports attached to the underside of the disc, resistance elements carried by the supports, reflector means within the cup, a cover element overlying the reflector element, and means uniting the several parts in assembled relation.

5. A heating unit for electrical cookers, said unit comprising a hollow case having top and bottom walls, the bottom wall having a large central aperture, a disc of wire mesh material disposed below the aperture in the bottom wall of the case, a plurality of refractory insulating supports attached to the underside of the disc, a second foraminous disc arranged within the case and parallel to the first disc, an annular reflector plate disposed above and spaced from the foraminous disc within the case and means uniting the parts in assembled relation.

6. A heating unit for electrical cookers, said unit comprising a substantially cylindrical case including a shallow cup-like bottom member and a cover member, electrical contact blades fixed to the cover member, a foraminous supporting disc attached to the underside of the bottom member, the latter having a central aperture, refractory insulating elements attached to said disc, electrical resistance wires supported by said insulating supports, an annular reflecting plate within the case, an open mesh shield within the case and below said reflecting plate, said shield being operative to prevent overheating of the plate, the terminals of the resistance wire passing up through the disc, shield and plate and being connected to the contact blades, means for insulating the terminals of the resistance wire from the disc, shield and plate, and means uniting the parts in assembled relation.

BUTLER AMES.

(References on following page)

REFERENCES CITED

The following references are of record in the file of this patent:

UNITED STATES PATENTS

| Number | Name | Date |
|---|---|---|
| 1,220,781 | Parkhurst | Mar. 27, 1917 |
| 2,215,042 | Howard et al. | Sept. 17, 1940 |
| 2,237,094 | Aske | Apr. 1, 1941 |

FOREIGN PATENTS

| Number | Country | Date |
|---|---|---|
| 279,418 | Italy | Nov. 12, 1930 |
| 493,533 | Great Britain | Jan. 4, 1937 |